(12) United States Patent (10) Patent No.: US 12,449,551 B2
Li et al. (45) Date of Patent: Oct. 21, 2025

(54) SIGNAL ANGLE AND SIGNAL FREQUENCY ESTIMATION METHOD, APPARATUS AND DEVICE AND STORAGE MEDIUM

(71) Applicant: SHENZHEN UNIVERSITY, Shenzhen (CN)

(72) Inventors: Qiang Li, Shenzhen (CN); Lei Huang, Shenzhen (CN); Bo Zhao, Shenzhen (CN); Min Huang, Shenzhen (CN); Weize Sun, Shenzhen (CN); Peichang Zhang, Shenzhen (CN); Shiqi Liu, Shenzhen (CN); Yuan Zhao, Shenzhen (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 350 days.

(21) Appl. No.: 18/041,734

(22) PCT Filed: Oct. 14, 2021

(86) PCT No.: PCT/CN2021/123920
§ 371 (c)(1),
(2) Date: Feb. 15, 2023

(87) PCT Pub. No.: WO2022/134762
PCT Pub. Date: Jun. 30, 2022

(65) Prior Publication Data
US 2023/0314622 A1 Oct. 5, 2023

(30) Foreign Application Priority Data
Dec. 24, 2020 (CN) .......................... 202011556223.8

(51) Int. Cl.
*G01S 19/37* (2010.01)

(52) U.S. Cl.
CPC .................................... *G01S 19/37* (2013.01)

(58) Field of Classification Search
CPC ....................................................... G01S 19/37
(Continued)

(56) References Cited

U.S. PATENT DOCUMENTS 11,277,180 B1 * 3/2022 Raghavan ............ H01Q 3/2617
2009/0262017 A1 10/2009 Zaruba et al.

FOREIGN PATENT DOCUMENTS

CN 103605139 A 2/2014
CN 104251997 A 12/2014
(Continued)

OTHER PUBLICATIONS

International Search Report, PCT/CN2021/123920, Jan. 13, 2022, 6 pages.

*Primary Examiner* — Harry K Liu
(74) *Attorney, Agent, or Firm* — Law Offices of Sandy Lipkin; Sandy Lipkin (57) ABSTRACT

A signal angle and signal frequency estimation method, apparatus, device and storage medium are provided. The signal angle and signal frequency estimation method comprises the steps: collecting initial data of a satellite signal by means of an antenna array element; substituting initial data into a signal function, and finding a solution to obtain the satellite signal; and obtaining the angel and frequency of the satellite signal according to the satellite signal. According to the method, in consideration of the non-Gaussian noise environment as well as spatial domain sparse feature and frequency domain sparse feature of the satellite signal, the angle and the frequency of the satellite signal are estimated jointly, thereby facilitating subsequent obtaining and tracking the satellite signal by a satellite navigation receiver.

6 Claims, 3 Drawing Sheets

(58) Field of Classification Search
USPC .......................................................... 342/352
See application file for complete search history.

(56) References Cited

FOREIGN PATENT DOCUMENTS

| | | | |
|---|---|---|---|
| CN | 106130571 | A | 11/2016 |
| CN | 107493106 | A | 12/2017 |
| CN | 108600133 | A | 9/2018 |
| CN | 108957387 | A | 12/2018 |
| CN | 109143154 | A | 1/2019 |
| CN | 109425875 | A | 3/2019 |
| CN | 109975842 | A | 7/2019 |
| CN | 111679296 | A | 9/2020 |
| CN | 106597480 | A | 12/2020 |
| CN | 112731486 | A | 4/2021 |
| JP | 2000296800 | A | 10/2000 |

\* cited by examiner

SIGNAL ANGLE AND SIGNAL FREQUENCY ESTIMATION METHOD, APPARATUS AND DEVICE AND STORAGE MEDIUM

CROSS REFERENCE TO RELATED APPLICATION

This patent application is a national stage of International Application No. PCT/CN2021/123920, filed on Oct. 14, 2021, which claims the benefit and priority of Chinese Patent Application No. 2020115562238 filed with the China National Intellectual Property Administration on Dec. 24, 2020. Both of the aforementioned applications are incorporated by reference herein in their entireties as part of the present application.

TECHNICAL FIELD

The present disclosure relates to the technical field of satellite signal processing, and in particular, to a signal angle and signal frequency estimation method, apparatus, device and storage medium.

BACKGROUND

The study on satellite signal angle estimation or satellite signal frequency estimation is usually carried out in the presence of Gaussian noise. However, non-Gaussian noise, such as impulse noise, is inevitable in the operation of satellite navigation receivers. At present, to the best of our knowledge, research on the joint angle and frequency estimation of satellite signal using antenna arrays has not received much attention yet in the presence of non-Gaussian noise.

SUMMARY

An objective of some embodiments is to provide a method, apparatus, device and a computer-readable storage medium for estimating a signal angle and a signal frequency, and intended to provide a method for estimating the angle and the frequency of a satellite signal in the presence of non-Gaussian noise. The method for estimating the signal angle and the signal frequency includes the following steps:
  collecting initial data of a satellite signal by an antenna array;
  substituting the initial data into a signal function to solve the signal function to obtain the satellite signal; and
  acquiring an angle and a frequency of the satellite signal according to the solved satellite signal.

In one embodiment, the substituting the initial data into the signal function to solve the satellite signal includes:
  re-weighting the signal function to obtain an objective function; and
  substituting the initial data into the objective function to solve the satellite signal.

In one embodiment, the substituting the initial data into the objective function to solve the satellite signal includes:
  substituting the initial data into the objective function, and solving the objective function by using a complex-valued conjugate gradient descent method to obtain the satellite signal.

In one embodiment, the acquiring the angle and the frequency of the satellite signal according to the solved satellite signal includes:
  performing Fourier transform on the satellite signal to obtain the frequency of the satellite signal, and an expression of the signal function is:

$$X = \arg\min_{X}\{\|Y - AX\|_{2,1} + \lambda_1\|X\|_{2,1} + \lambda_2\|XF\|_{2,1}\},$$

where X represents the satellite signal, Y represents the initial data, A represents a steering vector matrix, $\lambda_1$ and $\lambda_2$ represent regularization factors, and F represents the Fourier transform.

In one embodiment, an expression of the objective function is $$X = \arg\min_{X}\left\{\|Y - AX\|_{2,1} + \lambda_1\sum_{i=1}^{J}\rho_i\|X_i\|_2 + \lambda_2\sum_{i=1}^{J}\kappa_i\|(XF)_i\|_2\right\},$$

where $\rho_i$ and $\kappa_i$ are the i-th elements in weighted vectors $\rho$ and $\kappa$, respectively, i=1, 2, ..., J and J is the number of columns of A.

Furthermore, in order to achieve the above objective, the present disclosure also provides a device for estimating a signal angle and a signal frequency, comprising:
  a collecting module configured to collect initial data of a satellite signal by an antenna array;
  a substitution solving module configured to send feedback data to a sharing platform; and
  an acquisition module configured to acquire the angle and the frequency of the satellite signal according to the solved satellite signal.

Furthermore, in order to achieve the above objective, the present disclosure also provides a device for estimating a signal angle and a signal frequency, the device for estimating the signal angle and the signal frequency comprises a storage, a processor, and a program for estimating a signal angle and a signal frequency stored on the storage and operated on the processor, and the program for estimating the signal angle and the signal frequency, when executed by the processor, implements steps of the method for estimating the signal angle and the signal frequency according to any one of claims 1-6.

Furthermore, in order to achieve the above objective, the present disclosure also provides a storage medium, the storage medium is a computer-readable storage medium on which a program for estimating a signal angle and a signal frequency is stored, and the program for estimating the signal angle and the signal frequency, when executed by a processor, implements steps of the method for estimating the signal angle and the signal frequency according to any one of claims 1-6.

In the present disclosure, the initial data of the satellite signal is collected by the antenna array the initial data is substituted into the signal function to solve the signal function to obtain the satellite signal, and the angle and the frequency of the satellite signal are obtained according to the satellite signal. In the presence of non-Gaussian noise and in consideration of sparsity in both spatial domain and frequency domain of the satellite signals, the angle and the frequency of the satellite signal are estimated jointly, thereby being beneficial for a satellite navigation receiver to subsequently capture and track the satellite signals.

The realization of the object, functional features and advantages of embodiments of the present disclosure will be described in conjunction with the embodiments and with reference to the accompanying drawings.

DETAILED DESCRIPTION OF THE EMBODIMENTS

It should be understood that the specific embodiments described herein are merely illustrative of the present disclosure and are not intended to limit the present disclosure.

Figure 1:
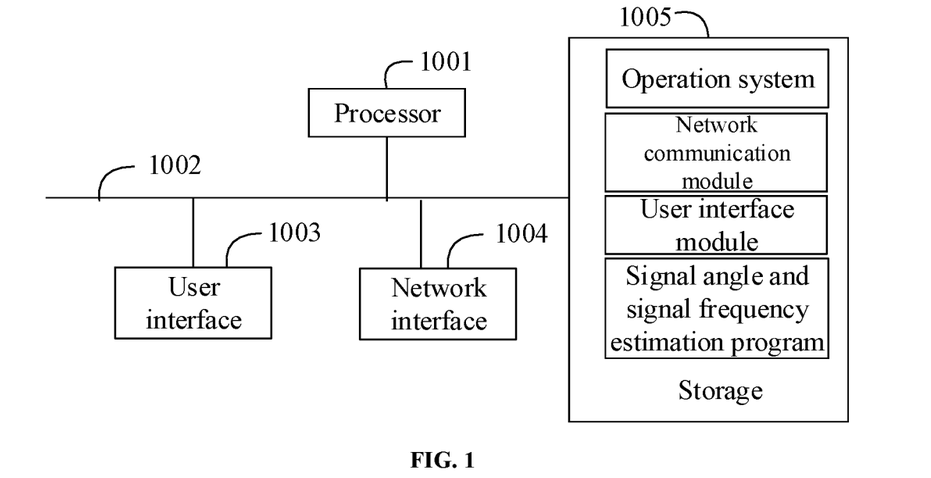
FIG. 1 is a schematic diagram of a hardware structure of a device for implementing various embodiments according to the present disclosure.

The present disclosure provides a signal angle and signal frequency estimation device. Referring to FIG. 1, FIG. 1 is a schematic structural diagram of a hardware operating environment involved in implantation of embodiments of the present disclosure.

It should be noted that FIG. 1 is a schematic structural diagram of the hardware operating environment of the signal angle and signal frequency estimation device. The signal angle and signal frequency estimation device in the embodiment of the present disclosure may be a PC (Personal Computer), a portable computer, a server, or the like.

As shown in FIG. 1, the signal angle and signal frequency estimation device may include a processor 1001 such as a CPU, a storage 1005, a user interface 1003, a network interface 1004, and a communication bus 1002. The communication bus 1002 is used to connect these components, for communication among these components. The user interface 1003 may include a display, an input unit such as a keyboard. Optionally, the user interface 1003 may also include a standard wired interface and a standard wireless interface. The network interface 1004 may optionally include a standard wired interface and a standard wireless interface (e.g., a Wi-Fi interface). The storage 1005 may be a high-speed RAM storage or a non-volatile storage such as a disk storage. The storage 1005 may optionally be a separate storage device from the processor 1001 described above.

Optionally, the signal angle and signal frequency estimation device may further include an RF (Radio Frequency) circuit, a sensor, a WiFi module, and the like.

Those skilled in the art can understand that a structure of the signal angle and signal frequency estimation device shown in FIG. 1 does not constitute a limitation on the signal angle and signal frequency estimation device, which may include more or less components than shown, or combine with certain components, or have different components arrangement.

As shown in FIG. 1, the storage 1005, as a computer readable storage medium, includes an operation device, a network communication module, a user interface module, and a signal angle and signal frequency estimation program. The operation device is a program that manages and controls hardware and software resources of the signal angle and signal frequency estimation device, and supports an operation of the signal angle and signal frequency estimation program and other software or programs.

The signal angle and signal frequency estimation device shown in FIG. 1 is configured to estimate an angle and a frequency of a satellite signal under a background of non-Gaussian noise. The user interface 1003 is mainly configured to detect or output various information, such as input initial data and output a satellite signal. The network interface 1004 is mainly configured to interact with and communicate with a backend server. The processor 1001 may be configured to call the signal angle and signal frequency estimation program stored in the storage 1005 and perform the following operations:

collecting initial data of a satellite signal by an antenna array;

substituting the initial data into a signal function to solve the satellite signal; and acquiring an angle and a frequency of the satellite signal according to the solved satellite signal.

In the present disclosure, the initial data of the satellite signal is collected by an antenna array, the initial data is substituted into the signal function to solve the satellite signal, the angle and the frequency of the satellite signal is acquired according to the solved satellite signal. Under non-Gaussian noise environment, and in consideration of sparse feature in both spatial domain and frequency domain of the satellite signal, the angle and the frequency of the satellite signal are estimated jointly, which is beneficial to subsequently capture and track the satellite signal by the satellite navigation receiver.

The specific embodiments of a mobile terminal of the present disclosure are basically identical with the following embodiments of a signal angle and signal frequency estimation method, and are not described here again.

Based on the above structure, various embodiments of the signal angle and signal frequency estimation method of the present disclosure are provided.

The present disclosure provides a signal angle and signal frequency estimation method.

Figure 2:
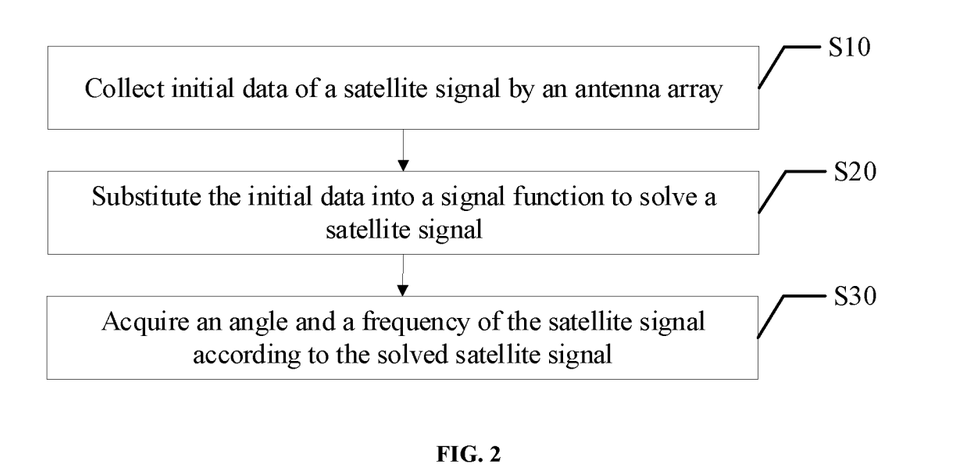
FIG. 2 is a flowchart of a signal angle and signal frequency estimation method according to a first embodiment of the present disclosure.

Referring to FIG. 2, FIG. 2 is a flowchart of a signal angle and signal frequency estimation method according to a first embodiment of the present disclosure.

In the present embodiment, an embodiment of a signal angle and signal frequency estimation method is provided. It should be noted that although a logical order is shown in the flowchart, in some cases, the steps shown or described may be performed in a different order from mentioned herein.

In this embodiment, the signal angle and signal frequency estimation method includes the following steps S10 to S30.

In step 10, initial data of a satellite signal is collected by an antenna array.

In this embodiment, with a satellite navigation receiver having antenna array as a research object, a method for jointly estimating an incident angle and a signal frequency of a satellite signal wave under the circumstance of non-Gaussian noise is considered. When the satellite navigation receiver operates, 6-10 visible satellites can be observed. The incident signal angle of the visible satellite is sparse in a spatial range in which the signal can be received by the antenna. In addition, due to the different relative motions between a carrier and the different satellites, Doppler frequency values for the different satellites signals arriving at the navigation receiver are different and lie between −10 kHz and 10 kHz. Since the satellite signal is a single-frequency signal, it only has a single obvious peak in the frequency domain, that is, the satellite signal can also be considered to have sparsity in the frequency domain. Therefore, in this embodiment, an optimization objective function is designed by using the sparsity of the satellite signal in the spatial domain and the frequency domain to jointly estimate the angle and the frequency of the satellite signal.

The satellite navigation receiver adopts a uniform linear antenna array, a number of antenna arrays is M, a spacing between adjacent arrays is d, each antenna array receives L signals and carries out a time domain sampling of K sampling points on each signal, to obtain the initial data of the satellite signal. It is understood that the initial data is a satellite signal including non-Gaussian noise. An angle range in the initial data is defined as $\Theta$, which is divided into J angles at equal intervals.

In step S20, the initial data is substituted into a signal function to solve a satellite signal. In this embodiment, the initial data is represented by Y. Generally, a model of the initial data Y received by the antenna array may be represented as Y=AX+N, where X represents the satellite signal without non-Gaussian noise, namely the satellite signal to be calculated, and is an J×K dimensional matrix with a sparse row structure, and the matrix contains L actual satellite signals, and have no data at the rest part. The initial data Y=[y(1), y(2), ..., y(K)] received by the antenna array is M×K dimensional matrix, y(k) (i=1, 2, ..., K) represents data containing non-Gaussian noise and collected by the antenna array at the k-th sampling moment, namely the initial data. N is non-Gaussian noise and is M×N dimensional matrix. A is the M×J dimensional steering vector matrix, which may be expressed as A=[a($\theta_1$), a($\theta_2$), ..., a($\theta_J$)], where a($\theta_j$) is the steering vector with an angle of $\theta_j$, and is expressed as:

$$a(\theta_j) = \left[1, e^{j2\pi \frac{d\sin\theta_j}{\lambda}} \dots e^{j2\pi(M-1)\frac{d\sin\theta_j}{\lambda}}\right]^T, \theta_j \in \Theta. \quad (1)$$

In equation (1), $\lambda$ represents a satellite signal wavelength.

The purpose of this embodiment is to accurately recover the satellite signal according to the initial data collected by the antenna array, so as to estimate the angle and the frequency of the satellite signal. The method simultaneously considers the non-Gaussian noise background condition and the spatial domain and the frequency domain sparsity of the satellite signal, and establishes the following function:

$$X = \arg\min_X f(X) \quad (2)$$
$$\arg\min_X \left\{\|Y - AX\|_{2,1} + \lambda_1\|X\|_{2,1} + \lambda_2\|(FX^T)^T\|_{2,1}\right\}.$$

In equation (2), $(\cdot)^T$ represents a transpose operation, $\lambda_1$ and $\lambda_2$ represents regularization factors, F is a K×K dimensional Fourier transform matrix, $\|\cdot\|_{2,1}$ represents the norm $\ell_{2,1}$, and is defined as:

$$\|X\|_{2,1} = \sum_{i=1}^{J}\sqrt{\sum_{j=1}^{K}|X_{ij}|^2}. \quad (3)$$

In equation (3), since F is the Fourier transform matrix, there is a property of F=F$^T$. Therefore, the above equation may be further simplified into the final signal function:

$$X = \arg\min_X\{\|Y - AX\|_{2,1} + \lambda_1\|X\|_{2,1} + \lambda_2\|XF\|_{2,1}\}. \quad (4)$$

The initial data is substituted into the equation (4) to solve the satellite signal.

In some embodiments, the step S20 further includes the following steps a and b.

In step a, the signal function is re-weighted to obtain an objective function.

In step b, the initial data is substituted into the objective function to solve the satellite signal.

In the above signal function, both a spatial domain constraint term $\|X\|_{2,1}$ and a frequency domain constraint term $\|X\,F\|_{2,1}$ are expressed by the $\ell_{2,1}$-norm. In order to make these two terms more sparse, a re-weighting method is introduced to transform the signal function into the objective function, to obtain:

$$X = \arg\min_X\left\{\|Y - AX\|_{2,1} + \lambda_1\sum_{i=1}^{J}\rho_i\|X_i\|_2 + \lambda_2\sum_{i=1}^{J}\kappa_i\|(XF)_i\|_2\right\}. \quad (5)$$

In the above equation, $X_i$ represents the i-th row data of the matrix X, (X F)$_i$ represents the i-th row data of the matrix (X F), and $\|\cdot\|_2$ represents the norm $\ell_2$, $\rho_i$ and $\kappa_i$ are respectively the i-th element in the weighted vector $\rho$ and $\kappa$, i=1, 2, ..., J, where $\rho$ and $\kappa$ are both J×1 dimensional weighted vector.

The initial function is substituted into the objective function to obtain the satellite signal.

In some embodiments, step b further includes the following step b1.

In step b1, the initial data is substituted into the objective function, and the objective function is solved by using a complex-valued conjugate gradient descent method to obtain the satellite signal.

The derivative of the above objective function is calculated with respect to the matrix X* and then the result is set to 0, i.e., $$\frac{\partial f(X)}{\partial X^*} = A^H C(AX - Y) + \lambda_1 DX + \lambda_2 G(XF)F^H = 0. \quad (6)$$

In equation (6), $(\cdot)^*$ and $(\cdot)^H$ represents a conjugate operation and conjugate transpose operation, respectively, matrices C, D and G are all diagonal matrices, the elements on their diagonals can be expressed as:

$$C_{ii} = \frac{1}{\|(AX - Y)_i\|_2}, \quad (7)$$

$$D_{ii} = \frac{\rho_i}{\|X_i\|_2}, \quad (8)$$

$$G_{ii} = \frac{\kappa_i}{\|(XF)_i\|_2}. \quad (9)$$

In equation (9), (AX−Y)$_i$ represents the i-th row data of the matrix (AX−Y), $\rho_i$ and $\kappa_i$ are respectively:

$$\rho_i = \frac{1}{\|X_i\|_2 + \eta_1}, \quad (10)$$

$$\kappa_i = \frac{1}{\|(XF)_i\|_2 + \eta_2}. \quad (11)$$

In equation (11), $\eta_1$ and $\eta_2$ both are small constant values greater than 0, to avoid the denominators of the above equations being 0.

In equation (6), F is the Fourier transform matrix, so:

$$FF^H = \frac{1}{K}. \quad (12)$$

In equation (12), K is the dimension of the Fourier transform matrix F. Therefore, the equation (6) may be written as:

$$A^H C(AX - Y) + \lambda_1 DX + \frac{1}{K}\lambda_2 GX = 0. \quad (13)$$

The equation (13) may be further adjusted to:

$$\left(A^H CA + \lambda_1 D + \frac{\lambda_2}{K}G\right)X = A^H CY. \quad (14)$$

According to equation (14), it is easy to obtain:

$$X = \left(A^H CA + \lambda_1 D + \frac{\lambda_2}{K}G\right)^{-1} A^H CY. \quad (15)$$

In Step S30, an angle and a frequency of the satellite signal are acquired according to the satellite signal.

It can be understood that each row of the satellite signal X exactly corresponds to an angle in signal range Θ received by the antenna array, and the frequency of the satellite signal is also obtained according to the satellite signal.

In some embodiments, the step S30 further includes the following step c.

In step c, the Fourier transform is performed on the satellite signal to obtain the frequency of the satellite signal.

Figure 3:
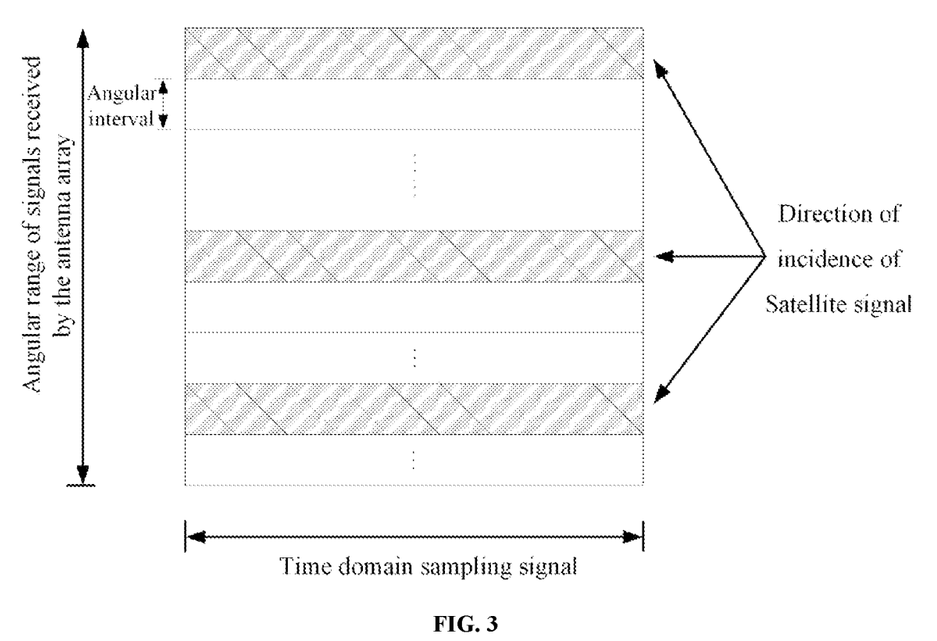
FIG. 3 is a schematic diagram of a spatial domain and a time domain according to the present disclosure.

It can be seen from FIG. 3 that each row of the recovered satellite signal X exactly corresponds to the angle in the signal range Θ received by the antenna array. According to the sparse structure of X, the angle corresponding to the row having data is the incident angle of the satellite signal, and the data in this row is the sampling value of the satellite signal. The frequency of the satellite signal can be found by performing the Fourier transform on each row of data according to FIG. 4. Therefore, according to the recovered satellite signal X, the incident angle and the frequency of the satellite signal can be obtained at the same time.

Figure 4:
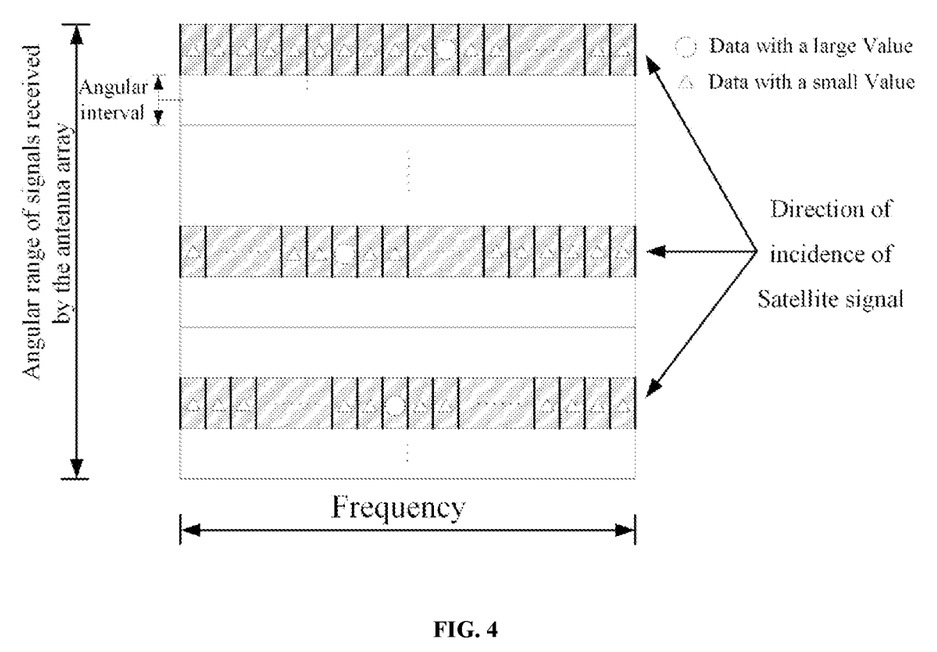
FIG. 4 is a schematic diagram of a spatial domain and a frequency domain according to the present disclosure.

FIG. 3 is a schematic diagram of a method for jointly estimating an angle and a frequency of a satellite signal, and is a schematic diagram of a space domain and a time domain. In FIG. 3, a vertical section represents an angular range of the signal received by the antenna array, and a horizontal section represents the time domain sampling of the received satellite signal. The colored area represents the received satellite signal, and the angle at which the target is located is spatially sparse. FIG. 4 is a schematic diagram of a spatial domain and a frequency domain, in which a vertical section in FIG. 4 still represents the angular range of the signal received by the antenna array, the horizontal section represents the frequency domain data of different satellite signals after Fourier transform. Because the Doppler frequencies generated by the relative motion between different satellites and the navigation receiver are different, the frequencies of different satellite signals after Fourier transform are also different. As shown in FIG. 4, each row has a data with a large value, and a frequency corresponding to the data is the frequency of the satellite signal. The data with large values in various row are located at different positions, that is, the corresponding signal frequencies are different.

In this embodiment, the initial data of the satellite signal is collected by the antenna array, the initial data is substituted into the signal function to solve the satellite signal, and the angle and the frequency of the satellite signal are obtained according to the satellite signal. Under a non-Gaussian noise environment and in consideration of both spatial domain sparse feature and frequency domain sparse feature of the satellites, the angle and the frequency are estimated jointly, which is favorable for subsequently capturing and tracking by satellite navigation receiver, satellite signals.

In the embodiment, with the navigation receiver having antenna array as a research object, under the non-Gaussian noise environment, through fully utilizing sparse feature of the satellite signal in the space domain and the frequency domain and designing the optimization objective function, the angle and the frequency of the satellite signal are jointly estimated, so that the antenna of the satellite navigation receiver can form beams in the direction of the satellite signal, to enhance a signal receiving gain. Further, the frequency of the satellite signal is extracted from a recovered signal to provide prior information for a frequency locked loop in subsequently processing a baseband signal by the navigation receiver.

Figure 5:
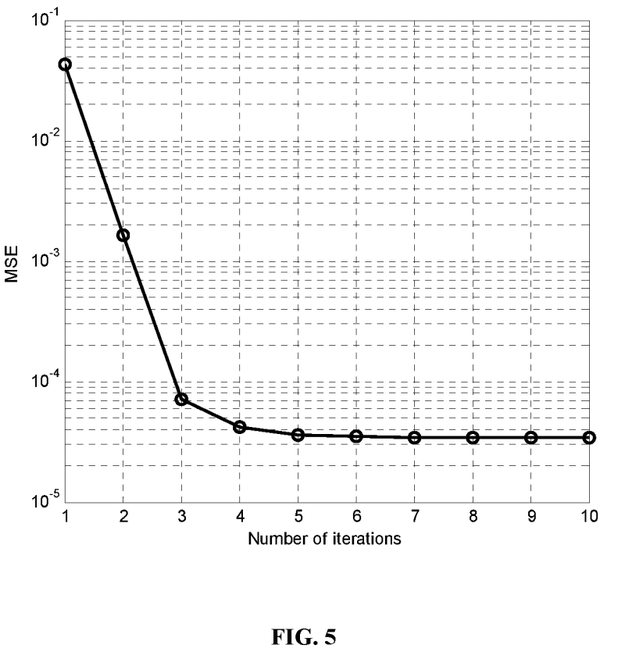
FIG. 5 is a simulation figure of MSE of a satellite signal estimate over a number of iterations.

The method proposed in this embodiment is tested. The uniform linear antenna array has 80 elements, the distance d between adjacent arrays is the half wavelength of the satellite signal, and the angle range of the signals received by the satellite is Θ=[−20°, 20°], which is divided at equal interval of 1°, that is J==41. It is assumed that there are L=4 satellite signals, the incident angles are randomly distributed in the range Θ, the signal sampling points K=50, and the regularization factor $\lambda_1=\lambda_2=0.1$. The noise was generated by a Gaussian mixture model with 20 dB signal-to-noise ratio. In equation (11) and (12), $\eta_1$ and $\eta_2$ are both 0.2. In this embodiment, it is necessary to use an iterative algorithm to initialize the diagonal matrix C, D and G are unit matrix, respectively. FIG. 5 shows a simulation graph of the Mean Square Error (MSE) of the satellite signal estimate X over the number of iterations. It can be seen from FIG. 5 that the MSE of the satellite signal estimate X gradually decreases as the number of iterations increases. When the number of iterations reaches 7, MSE value is converged to $3\times10^{-5}$, and the MSE performance is good.

In addition, an embodiment of the present disclosure also provides a signal angle and signal frequency estimation device, the signal angle and signal frequency estimation device includes:

a collecting module configured to collect initial data of a satellite signal by an antenna array;

a substitution solving module configured to send feedback data to a sharing platform;

an acquiring module, configured to acquire an angle and a frequency of the satellite signal according to the satellite signal. Embodiment of the signal angle and signal frequency estimation device of the present disclosure is basically the same as the above embodiments, and is not described herein again.

In addition, the embodiment of the present disclosure also provides a computer readable storage medium, the computer readable storage medium stores a signal angle and signal frequency estimation program, and when the signal angle and signal frequency estimation program is executed by a processor, each step of the signal angle and signal frequency estimation method is realized.

It is noted that the computer readable storage medium may be provided in the signal angle and signal frequency estimation device.

Embodiment of the signal angle and signal frequency estimation program of the present disclosure is basically the same as the embodiment of the signal angle and signal frequency estimation method, and is not described herein again.

It should be understood that, in this specification, the terms "comprises," "comprising," or any other variation thereof, are intended to cover a non-exclusive inclusion, such that a process, method, article, or device that includes a list of elements does not include only those elements but include other elements not expressly listed, or elements inherent to such process, method, article, or device. An element defined by the phrase "comprising one (a)" does not exclude, without further limitation, the presence of another identical element in the process, method, article or device comprising such element.

The above serial number of that embodiments of the present disclosure are for description only, and do not represent the advantage or disadvantages of the embodiments.

Through the description of the above embodiments, those skilled in the art can clearly understand that the method of the above embodiments can be implemented by means of software and a necessary general hardware platform. Of course, it can also be implemented by means of hardware, but in many cases, the former is a better implementation. Based on such understanding, the essence of the technical solution of the present disclosure or the part contributing to the prior art may be embodied in the form of a software product. The computer software product is stored in a storage medium (such as ROM/RAM, a magnetic disk, or an optical disk), and includes a plurality of instructions for enabling a terminal device (which may be a mobile phone, a computer, or a server, an air conditioner, or a network device, etc.) to perform the method described in various embodiments of the present disclosure.

The above is only preferred embodiments of the present disclosure, and is not intended to limit the patent scope of the present disclosure. Any equivalent structure or equivalent process transformation made by using the contents of the description and drawings of the present disclosure, or directly or indirectly applying to other related technical fields, shall also be included in the patent protection scope of the present disclosure.

What is claimed is:

1. A signal angle and signal frequency estimation method, comprising:
   collecting, by antenna elements of an antenna array in a satellite navigation receiver, a plurality of primary satellite signals and carrying out a time domain sampling on each primary satellite signal, to obtain initial data of satellite signals;
   substituting, by a processor in the satellite navigation receiver, the initial data into a signal function to solve the satellite signals, wherein an expression of the signal function is:

$$X = \arg\min_X \{\|Y - AX\|_{2,1} + \lambda_1 \|X\|_{2,1} + \lambda_2 \|XF\|_{2,1}\}$$

wherein X is a matrix representing the satellite signals, Y is a matrix representing the initial data, A represents a steering vector matrix, $\lambda_1$ and $\lambda_2$ represent regularization factors, and F represents a Fourier transform matrix, $\|\cdot\|_{2,1}$ represents a norm $\ell_{2,1}$;

wherein the substituting, by the processor in the satellite navigation receiver, the initial data into a signal function to solve the satellite signals comprises: re-weighting, by the processor, the signal function to obtain an objective function;

and substituting, by the processor, the initial data into the objective function to solve the satellite signals, wherein an expression of the objective function is:

$$X = \arg\min_X \left\{\|Y - AX\|_{2,1} + \lambda_1 \sum_{i=1}^{J} \rho_i \|X_i\|_2 + \lambda_2 \sum_{i=1}^{J} \kappa_i \|(XF)_i\|_2\right\}$$

wherein $X_i$ represents an i-th row data of X, $(X F)_i$ represents an i-th row data of a matrix (X F), and $\|\cdot\|_2$ represents a norm $\ell_2$, $\rho_i$ and $\kappa_i$ are respectively an i-th element in a weighted vector $\rho$ and $\kappa$, i=1,2, . . . , J, $\rho$ and $\kappa$ are both J×1 dimensional weighted vector, and J is a number of columns of A;

acquiring, by the processor, an angle and a frequency of each satellite signal according to solved satellite signals;

forming, by the antenna array in the satellite navigation receiver, beams in a direction of the satellite signal according to the angle of the satellite signal; and tracking, by a frequency locked loop in the satellite navigation receiver, the satellite signal according to the frequency of the satellite signal.

2. The signal angle and signal frequency estimation method according to claim 1, wherein the substituting, by the processor, the initial data into the objective function to solve the satellite signal comprises:
   substituting, by the processor, the initial data into the objective function, and
   solving, by the processor, the objective function by using a complex-valued conjugate gradient descent method to obtain the satellite signals.

3. The signal angle and signal frequency estimation method according to claim 1, wherein a sampling value of each satellite signal represents an incident angle of the satellite signal, and wherein the acquiring, by the processor, an angle and a frequency of each satellite signal according to solved satellite signals comprises:
   performing, by the processor, Fourier transform on the satellite signals to obtain the frequency of each satellite signal.

4. A signal angle and signal frequency estimation device, comprising:
   a memory, configured to store computer-executable programs;
   a processor, configured to execute the computer-executable programs for:
   receiving initial data of satellite signals, which are obtained through collecting, by antenna elements of an antenna array in a satellite navigation receiver, a plurality of primary satellite signals and carrying out a time domain sampling on each primary satellite signal;

substituting the initial data into a signal function to solve the satellite signals, wherein an expression of the signal function is:

$$X = \underset{X}{\arg\min} \left\{ \|Y - AX\|_{2,1} + \lambda_1 \|X\|_{2,1} + \lambda_2 \|XF\|_{2,1} \right\}$$

wherein X is a matrix representing the satellite signals, Y is a matrix representing the initial data, A represents a steering vector matrix, $\lambda_1$ and $\lambda_2$ represent regularization factors, and F represents a Fourier transform matrix, $\|\cdot\|_{2,1}$ represents a norm $\ell_{2,1}$; and wherein substituting the initial data into a signal function to solve the satellite signals comprises: re-weighting the signal function to obtain an objective function; and substituting the initial data into the objective function to solve the satellite signals, wherein an expression of the objective function is:

$$X = \underset{X}{\arg\min} \left\{ \|Y - AX\|_{2,1} + \lambda_1 \sum_{i=1}^{J} \rho_i \|X_i\|_2 + \lambda_2 \sum_{i=1}^{J} \kappa_i \|(XF)_i\|_2 \right\}$$

wherein $X_i$ represents an i-th row data of X, $(X\ F)_i$ represents an i-th row data of a matrix (X F), and $\|\cdot\|_2$ represents a norm $\ell_2$, $\rho_i$ and $\kappa_i$ are respectively an i-th element in a weighted vector $\rho$ and $\kappa$, i=1,2, . . . , J, $\rho$ and $\kappa$ are both J×1 dimensional weighted vector, and J is a number of columns of A;

acquiring an angle and a frequency of each satellite signal according to solved satellite signals;

wherein, the antenna array is configured for forming beams in a direction of the satellite signal according to the angle of the satellite signal; the satellite navigation receiver further comprises a frequency locked loop configured for tracking the satellite signal according to the frequency of the satellite signal.

5. A signal angle and signal frequency estimation device, wherein the signal angle and signal frequency estimation device comprises a storage, a processor, and a signal angle and signal frequency estimation program stored on the storage and operated on the processor, and the signal angle and signal frequency estimation program, when executed by the processor, implements steps of the signal angle and signal frequency estimation method according to claim 1.

6. A storage medium, wherein the storage medium is a computer-readable storage medium on which a signal angle and signal frequency estimation program is stored, and the signal angle and signal frequency estimation program, when executed by a processor, implements steps of the signal angle and signal frequency estimation method according to claim 1.

* * * * *